United States Patent [19]

Knirsch et al.

[11] Patent Number: 4,536,776
[45] Date of Patent: Aug. 20, 1985

[54] INK-JET PRINTING DEVICE

[75] Inventors: Franco Knirsch, Banchette; Giovanni Gianolini, Lozza; Gian D. Dagna, Ivrea; Mario Buat, Carema, all of Italy

[73] Assignee: Ing. C. Olivetti & C., S.p.A., Ivrea, Italy

[21] Appl. No.: 431,279

[22] Filed: Sep. 30, 1982

[30] Foreign Application Priority Data

Oct. 5, 1981 [IT] Italy ................. 68285 A/81

[51] Int. Cl.³ ........................................... G01D 15/18
[52] U.S. Cl. ............................................ 346/140 R
[58] Field of Search ............................... 346/140 PD

[56] References Cited

U.S. PATENT DOCUMENTS

| | | | |
|---|---|---|---|
| 3,911,448 | 10/1975 | Ohno | 346/140 PD |
| 4,320,406 | 3/1982 | Heinzl | 346/140 PD |
| 4,333,088 | 6/1982 | Diggins | 346/140 PD |
| 4,380,770 | 4/1983 | Maruyama | 346/140 PD |
| 4,432,003 | 2/1984 | Barbero | 346/140 PD |

*Primary Examiner*—E. A. Goldberg
*Assistant Examiner*—Mark Reinhart
*Attorney, Agent, or Firm*—Banner, Birch, McKie & Beckett

[57] ABSTRACT

The device comprises a plurality of ink reservoirs, each connected to a number of nozzles (22) equidistant along a corresponding row. The nozzles connected to the various reservoirs are spaced apart vertically by at least one line space. The device can be used for printing different lines in parallel, moreover subdividing the length of the line, or for printing different zones of the sheet in facsimile. The ink is kept in circulation between the reservoirs and the nozzles by a common peristaltic pump which acts by a series of actuating elements on the discharge ducts for the inks in the reservoirs. The reservoirs may contain inks of different colors to permit printing in different colors or polychrome facsimile printing by additive or subtractive synthesis of the colors. The ink is conductive and is kept at earth potential, while electrodes (23) disposed outside the corresponding nozzles (22) are energized selectively to produce sprays of particles of ink from the nozzles. The ink contains a mixture of a dye of direct or solvent or acid type with a solution of water, electrolytic compounds, moistening agents, thickeners, preserving agents and antifoaming agent. The ink is prepared by mixing the compounds under agitation, then mixing in the dye until a predetermined acidity is obtained and finally filtering it and sealing it in the pack in the absence of air.

12 Claims, 10 Drawing Figures

INK-JET PRINTING DEVICE

BACKGROUND OF THE INVENTION

The present invention relates to a selective ink-jet printing device for alphanumeric serial-parallel printing and/or for printing of facsimile type, comprising a plurality of containers for inks of different colours and a plurality of nozzles connected to the containers. The invention also relates to the types of ink which are adapted to permit ink-jet printing in several colours, both by super-imposition and by the bringing near of colours, and to a method of preparation of such inks.

Devices for printing in several colours are known wherein the nozzles are borne by a single structure and are connected to different ink reservoirs. In one known device, the droplets of ink are expelled from the nozzles by means of pressure impulses generated by piezoelectric elements. The droplets of ink turn out relatively heavy, however, creating both problems of drying and superimposition of colours and problems of blocking of the nozzles, especially in the case of little used colours.

SUMMARY OF THE INVENTION

The object of the present invention consists in producing a device for printing in colours and the corresponding inks, wherein blocking of the nozzles is eliminated, rapid drying and an optimum effect of superimposition of the colours being nevertheless obtained. This technical problem is solved by the printing device according to the invention, which is characterized in that the nozzles are disposed in such a manner as to print on different zones of the paper, the ink being electrically conductive and in contact with a corresponding electrode, each nozzle being provided with a corresponding counter-electrode disposed outside the nozzle and adapted to be energized selectively by a voltage such as to produce an ion discharge between the counter-electrode and the meniscus of the ink in the respective nozzle and a resistive current in the ink for causing the expulsion of a plurality of particles of ink through the said nozzle.

According to another characteristic of the invention, the ink is constituted by an aqueous mixture of dyestuff, characterised by a hydrolytic salt in an amount such as to impart to the ink a specific resistance between 15 and 50 ohm.cm. The dyestuff is preferably chosen among the following: Blu Brillante Drimaren KBL by Sandos, Blu Brillante Acilan FFR, Croceina Speciale MOO-S or Rosso Carta 4B by Bayer, for non-black printing.

The ink is prepared by first mixing the hydrolytic salt with water under agitation, then adding the other additives and finally adding the dye until a pH between 6 and 10 is obtained.

BRIEF DESCRIPTION OF THE DRAWINGS

The invention will now be described in more detail, by way of example, with reference to the accompanying drawings, in which.

DESCRIPTION OF THE PREFERRED EMBODIMENTS

The printing device is of the serial-parallel ink-jet type, wherein there is provided at least one series of nozzles disposed along a line, each adapted to print on a given portion of the line itself. Each nozzle closes a container of electrically conductive ink and carries an electrode adapted to be energized to cause the emission of a spray of ink particles, substantially as described in our U.S. application Ser. No. 392,664 filed on June 28, 1982. The printing device is adapted to print selectively with inks of four different colours, as will be seen better hereinafter.

Figure 1:
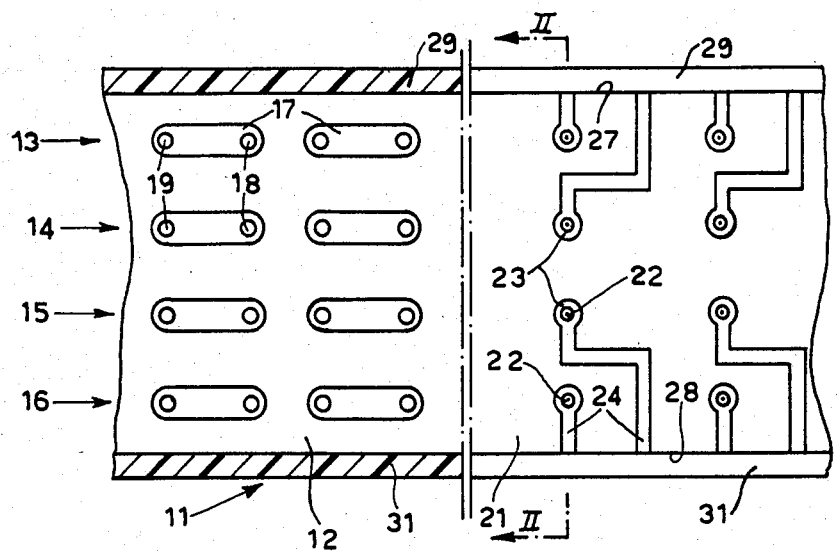
FIG. 1 is a partial front view of a printing head embodying the invention.
Figure 2:
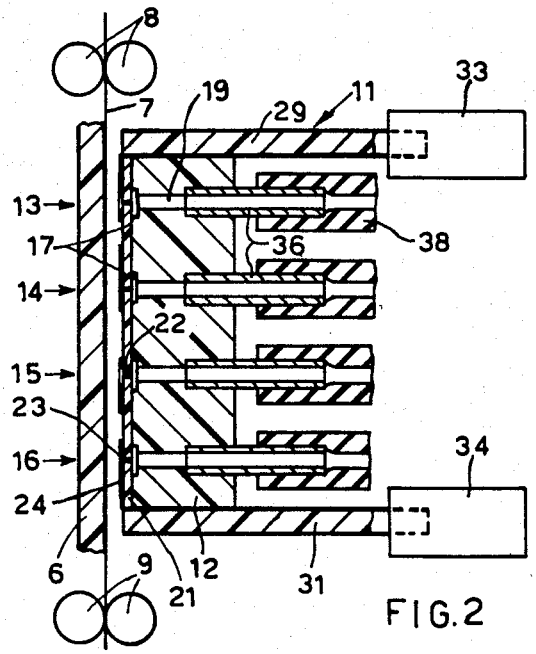
FIG. 2 is a section on the line II—II of FIG. 1.

More particularly, the printing device comprises a fixed bar 6 (FIG. 2) supporting the paper 7, which is fed vertically in known manner through two series of pairs of rollers 8 and 9. In front of the paper 7 there is disposed a printing head 11, which comprises a body 12 of insulating material, for example Delrin, in which are formed four rows 13, 14, 15 and 16 of ink containers 17 (FIG. 1) each constituted by a shallow oblong recess provided at the rear with an inlet hole 18 and an outlet hole 19. The containers 17 are closed by a plate 21 also of insulating material, for example alumina, in which are formed four rows of nozzles 22 with a diameter of a few hundredths of a millimeter, for example 35μ. Each nozzle 22 is arranged in the centre of the corresponding container 17. The thickness of the plate 21, and therefore the length of the nozzle 22, is of the same order of magnitude as the depth of the container 17.

Figure 3:
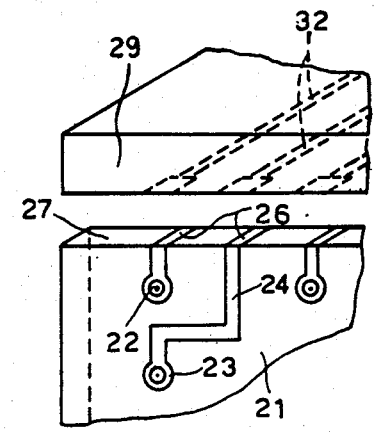
FIG. 3 is a perspective view of a detail of the head.

On the outer surface of the plate 21, in correspondence with each nozzle 22, there is disposed an annular electrode 23 obtained by the silk screen process together with a conductor 24 of which a length 26 (FIG. 3) extends across the upper edge 27 or lower edge 28 of the plate 21. The head is closed at the top and the bottom by two plates 29 and 31 also of alumina, which each bear a series of conductors 32 printed by the screen process on the inner face. These are connected on the one hand to the lengths of conductor 26 of the corresponding edges 27 and 28 and are connected on the other hand to two multiple electric connectors 33 and 34 (FIG. 2) for connection to the driving circuit, not shown in the drawings.

The nozzles 22 of each of the rows 13 to 16 are spaced apart by a pitch equal to a fraction of the printing line, for example 12.7 mm, equal to five normal print characters. The rows 13 to 16 of the various nozzles 22, on the other hand, are spaced apart by a printing line-space, for example 5 mm. The printing head 11 is mounted in known manner on a carriage not shown in the drawings, which is movable transversely over a useful stroke equal to the distance between the nozzles 22 of a row, for which reason each nozzle 22 of a row can print a group of five characters of the line, while the nozzles of the various rows 13 to 16 print on different lines.

Figure 4:
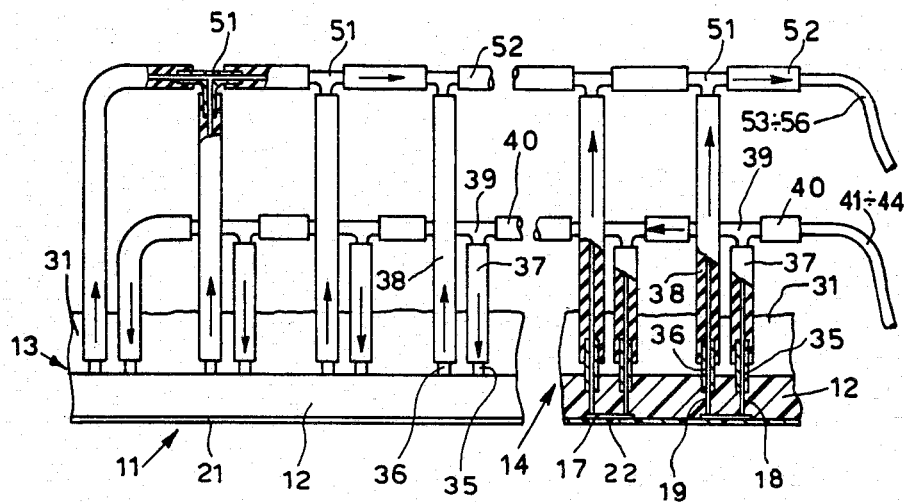
FIG. 4 is a diagram of the ink ducts.

In each of the holes 18 and 19 of each container 17 there is inserted a small stainless steel tube 35 and 36, respectively (FIG. 4). The inlet tube 35 is electrically connected to earth, whereby it keeps the ink in the corresponding container 17 also earthed. Over each of the tubes 5 and 36 there is moreover engaged a plastics inlet duct 37 and a plastics outlet duct 38, respectively. The various inlet ducts 37 of the containers 17 of each of the rows 13 to 16 are connected by means of T couplings 39 to a common duct 40 arranged in the head. Each of the four ducts 40 is connected in turn to a flexible tube 41, 42, 43 and 44 corresponding to each row of nozzles 22. These flexible tubes are connected to four connectors 45 which pass into four corresponding ink reservoirs 46, 47, 48, 49 disposed on the fixed frame of the printing device.

The various outlet ducts 38 of the containers of each of the rows 13 to 16 are connected by means of other T couplings 51 to another common duct 52 arranged in the head 11.

Figure 6:
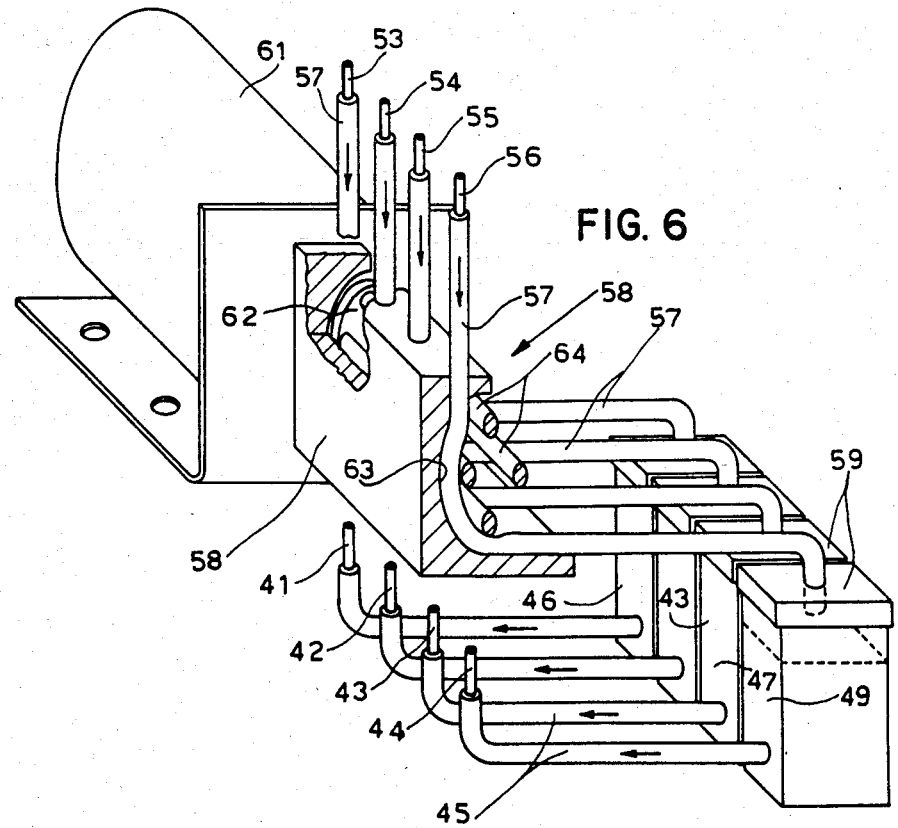
FIG. 6 is a perspective view of an ink circulating system.

Each common duct 52 is connected in turn to a flexible tube 53, 54, 55 and 56 corresponding to each of the rows 13 to 16 of nozzles 22. The four tubes 53 to 56 (FIG. 6) terminate in four elastic connectors 57 inserted in a common peristaltic pump 58 also disposed on the fixed frame of the printing device. Each of the four connectors 57 finally passes through the cover 59 and they open into the corresponding reservoirs above the level of the respective ink.

The peristaltic pump 58 is formed by an electric motor 61 which acts through a reduction gear to cause a disc 62 to rotate slowly. The pump moreover comprises a cylindrical cam 63 which is eccentric towards the bottom with respect to the disc 62. The latter bears concentrically with its axis and equidistant a certain number of rollers 64, for example four. The connectors 57 are inserted between the cam 63 and the rollers 64 and during the rotation of the disc 62 are periodically lightly squeezed by the latter at the lowest point of the cam where it is closest to the rollers 64. Thus, a suction from the containers 17 of the head 11 is created in the connectors 57 towards the reservoirs 46 to 49. A circulation of ink is therefore created in the containers 17 which allows possible ink bubbles to be eliminated from the nozzles 22, permitting the ink to re-enter the nozzle by capillarity, forming a concave meniscus therein. By energizing the various electrodes 23 (FIG. 1) of the nozzles 22 selectively as a function of the position of the carriage and of the data of the image or of the text to be printed, a corresponding spray of ink is produced in each nozzle 22 and prints a corresponding dot on the paper 7, whereby a line can be printed in a very short fraction of time.

The frequency of energization of the nozzles 22 is of the order of 10 to 15 thousand Hz and the carriage can be moved transversely so as to print the desired density of dots, for example 3 dots/mm in accordance with a matrix of 7×5 dots, or 8 to 10 dots/mm as in high-definition printing or in the reproduction of images of facsimile apparatus.

The paper may be fed in elementary steps of ⅔ of a mm for printing in accordance with the 5×7 matrix or in elementary steps of 1/6 to ⅛ of a mm for high-definition printing.

Moreover, the four reservoirs 46 to 49 (FIG. 6) may contain the same ink, in which case each of the rows 13 to 16 of nozzles 22 will be able to reproduce a different line of print or image strip. After the printing of a line or a strip, that is after the number of elementary line spaces required by the printing matrix or the image strip, the paper carries out an advance in such manner as to bring the last row of printed dots immediately above the tow 13 of nozzles 22.

Figure 5:
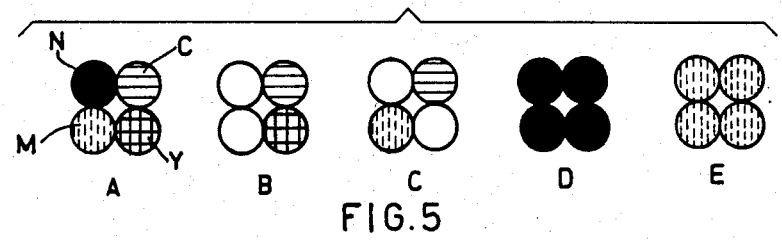
FIGS. 5A–E are diagrams illustrating the synthesis of colours.

On the other hand the four reservoirs 46 to 49 may contain inks of different colours, e.g. black in the reservoir 46, yellow in the reservoir 47, magenta in the reservoir 48 and cyan in the reservoir 49. The rows of electrodes 23 may then be energized selectively, in combination with the advance of the paper 7, either to reproduce a text in different colours or to reproduce multicoloured images. In the second case, in addition to the abovementioned four colours of the inks, it is also possible to obtain other colours produced by the combination of the aforesaid colours. This combination may be obtained subtractively by causing the printing of the dots of different colours one on top of the other. More particularly, by covering the magenta with yellow, the cyan with yellow or the cyan with magenta, it is also possible to print in red, in green or in blue. Alternatively, the combination of colours can be obtained by reducing the distance of the paper 7 from the nozzles 22 to the maximun extent, for example down to 0.1 mm, and producing movements of the paper horizontally and vertically of about one half of the distance between the dots both when passing from one row of nozzles to another and between one pass and another of the same row of nozzles. In this way, an elementary dot may be constituted by four elementary dots in accordance with the diagram of FIG. 5.

The arrangement A shows the positions allocated to each colour, using the letters N, C, M and Y to symbolize black, cyan, magenta and yellow respectively. Example B shows a dot of green colour, example C shows a dot of blue colour, example D shows a dot of black colour and example E shows a dot of magenta colour.

As described in the Patent Application mentioned above, the printing process is due to the energization of the electrode 23, which causes a surface turbulence on the meniscus of ink of the corresponding nozzle 22 due to the discharge of ions, while the passage of ionic and resistive current in the ink in the narrowest section of the nozzle 22 causes a sudden increase in the pressure which produces a spray of ink particles at high speed towards the paper 7.

This particular printing process requires the formulation and identification of ink compositions with special properties. More precisely, the problem of ink clots and of the related blockages is very limited inasmuch as the process causes the disintegration of the clots and is therefore self-cleaning. However, the electrical and electrochemical characteristics of the ink are critical. The most important characteristics are the electrical conductivity, the viscosity, the pH, the surface tension and the absence of generation of gas electrochemically at the electrodes. The chemicophysical characteristic of the ink must moreover permit the formation of very small drops which must arrive on the paper in a very small area (0.05 $mm^2$). Finally, the ink must ensure rapid drying on the paper and at the same time good penetration into the paper itself. In order to satisfy all the requirements mentioned, the ink needs accurate formulation and suitable making up.

The inks suitable for this printing process all have an aqueous base, with a relatively low electrical resistivity, for example between 15 and 50 ohm.cm, a viscosity from 1.10 cp to 2.5 cp, a high surface tension of 60 to 70 dyne/cm and an acidity between pH 6 and pH 10.

The conductivity of these inks is obtained by a suitable concentration of electrolytes in the vehicle. Consequently, the water serves as a solvent and represents the most important constituent of the vehicle. To the solution of electrolyte there are added as moistening agents or humectants glycolic derivatives such as N-methylpyrrolidone glycerine, ethanolamine, and derivatives of ethylenediamine. These moistening agents have the function of keeping the nozzle orifice always clear.

There are then added, as thickeners, water-soluble polymers such as shellac, polyvinylpyrrolidone, sodium alginate, carboxymethyl cellulose, polyethylene glycols of high molecular weight and the like. These constituents give the desired viscosity to the ink and a stability in the liquid phase, while on the paper they give well-defined dots by the formation of a film in the droplet. Finally, there are added preserving agents (fungicidal, antibacterial) and antifoaming agents in concentrations such as to ensure good preservation and stability of the ink.

Dyes of direct type, or solvent type or acid type, which are very soluble in water, stable to light and atonic, are used for formulating these inks.

Among them, for black ink, the following products (the name of the manufacturing company is given in brackets) have been tried with advantage: Avilan Fast Black (CIBA), Black RL (BASF) and Nylamine Acid Black DR (CIBA), Acidol Black MSRL, Vialon Fast Black RL, Sudan Deep Black BB and Neozapoce Black RE (BASF), Sanogran Black 5 BL and Pyrazole Black SD (SANDOZ), Nigrosina WLF and Nigrosina W1 (BAYER). This last product is listed as acid black with the No. 50420 in the Colour Index, 3rd Edition, of the American Association of Textile Chemistry and Colourists.

As preserving agents with an antibacterial and/or bacteriostatic action there have been used derivatives of phenol and other products commonly used in cosmetics. In particular there have been used preserving agents soluble in water and in very low concentration from 0.1 to 0.8%, among which are the bacteriostatic compound known by the name Biostat Enosina (KURARAY LTD., JAPAN), Germall 115 (SUTTAN LAB. INC.), Vancide 89 RE (R. T. VANDERBILT CO.) and Gerenamin (HOECHST), which is an antimicrobic with a base of derivatives of a quaternary ammonium salt.

Other products with an antibacterial action have also been tested, such as: sodium merthiolate, phenol, the esters of p-hydroxybenzoic acid, the benzyl and phenylethyl alcohols. Formalin in a concentration of 1 to 3% has been used as a bacteriostatic. As antifoaming agents there have been used products by DOW CORNING (antifoaming agent B in emulsion) and by WACKER (silicone antifoaming agent SE), in concentrations of 0.1 to 0.5%.

In view of the high conductivity of the ink required by the printing process, the phenomenon of electrolysis occurs in the space between the elctrodes during the discharge. The phenomenon induces the formation of hydrogen at the cathode formed by the meniscus of the ink in the nozzle when the reduction potential of the constituents of the ink has a value higher than the potential of discharge of the hydrogen. This reduction potential must be closely controlled in order to avoid the occurrence of deposits or changes in the constituents of the ink at the cathode, instead of the evolution of hydrogen as gas.

The formulation of the vehicle perfected for black ink has been kept almost unchanged for formulating the coloured inks, the black dye being replaced by acid, direct, soluble dyes in concentrations from 0.5 to 1.5%.

For the yellow ink, the Special Yellow S (BAYER) indicated as acid yellow in the aforesaid Color Index, with the No. 13015, has been tested. For the cyan ink, the Blu Brillante Drimaren KBL (SANDOZ) and the Blu Brillante FFR (BAYER) have been tested, the latter indicated in the Colour Index as Direct Blue No. 43735. Finally, for the magenta ink, there have been tested the Croceina Speciale MOO-S (BAYER) indicated in the Colour Index as acid red No. 27290 and the Rosso Carta 413 (BAYER) indicated in the Colour Index as direct red No. 28160.

The ink is prepared in successive steps by mixing, in a suitable glass vessel, the constituents of the vehicle (water, glycol, amine, etc.), and there are added under agitation, in various concentrations, the various additives (surface-active, antimicrobic, stabilizing, electrolytic, etc.). With the solution clear, the dye is added and, after about half an hour, with the solution complete, the pH is checked and is adjusted to the desired value.

The ink obtained in this way requires ultrafiltration, which must be carried out by successive passages through filters of $25\mu$, $10\mu$, $5\mu$, $2.5\mu$, $1.0\mu$, $0.45\mu$ porosity. All the different ultrafiltration passages are conducted under vacuum at a pressure of 25 mm of mercury.

With filtration completed, the water lost by evaporation under vacuum is restored, rebalancing the initial weight. The ink must then be kept in a suitable pack sealed in the absence of air. The following Examples illustrate standard ink formulations which, having been tested in the ink-jet printing process described before, have given optimum results.

EXAMPLE 1

80 g of demineralized water are placed in a glass vessel and 5 g of polyvinylpyrrolidone K 30 are dissolved under agitation. With solution complete, 2.5 g of N-methylpyrrolidone, 2.5 g of LiCl and 5.0 g of polyethylene glycol (molecular weight 200) are added. With the solution clear, 5.0 g of dye (Nigrosina W1), 0.15 g of antimicrobic agent and 0.3 g of antifoaming agent are added.

The successive ultrafiltrations and packaging in the absence of air are thereafter carried out. This ink has a pH=10.6, a viscosity of 2.0 cp, and a $\rho$ (resistivity or specific resistance) of 24 ohm.cm.

EXAMPLE 2

0.25 g of sodium alginate is dissolved in 80 g of water in a glass vessel. 4.0 g of N-methylprrolidone, 3.0 g of P.E.G. (200), 1.0 g of methylcellosolve, 3.5 g of Nigrosina W1 and 2.5 g of LiCl are added. With solution complete, 0.2 g of antimicrobic agent and 0.3 g of antifoaming agent are added.

The procedure as for Example 1 is carried out and similar chemicophysical characteristics of the ink are obtained.

EXAMPLE 3

10.0 g of ethylene glycol, 35.0 g of a 20% solution of Nigrosine W1, 2.5 g of electrolyte, 0.2 g of fungicide and 0.5 g of antifoaming agent are added to 55.0 g of water. The solution is then filtered with a $4.5\mu$ filter and is placed in a sealed container. This ink has a viscosity of 1.3 cp, a $\rho$ (resistivity or specific resistance) of 23 ohm.cm and a surface tension of 60 dyne/cm.

EXAMPLE 4

10.0 g of ethylene glycol, 55.0 g of Nigrosine W1 solution (20%), 2.5 g of electrolyte, 0.2 g of fungicide and 0.5 g of antifoaming agent are added to 35.0 g of water. The solution is passed through a 4.5μ filter under vacuum and the ink is placed in a sealed container.

Viscosity 2.6 cp, ρ (resistivity or specific resistance) 21 ohm.cm, surface tension 56 dyne/cm.

EXAMPLE 5

20 g of Nigrosine W1 (20% solution), 2.5 g of electrolyte, 0.2 g of fungicide and 0.5 g of antifoaming agent are added to 80 g of demineralized water. Filtering with a 0.45μ filter is carried out and the ink is placed in a sealed container.

Viscosity 1.2 cp, ρ (resistivity or specific resistance) 35 ohm.cm, surface tension 65 dyne/cm.

EXAMPLE 6

1.0 g of ethylene glycol, 2.5 g of electrolyte, 0.5 g of Croceina special MOO-S (BAYER), 0.2 g of fungicide and 0.5 g of antifoaming agent are added to 97 g of demineralized water.

Filtered through a 0.45μ filter and packaged, this red-coloured ink has a pH=8.5, a viscosity of 1.18 cp, a ρ (resistivity or specific resistance) of 48 ohm.cm and a surface tension of 68 dyne/cm.

EXAMPLE 7

1.0 g of ethylene glycol, 6.0 g of Acidol MSRL (BASF), 2.5 g of electrolyte, 0.2 g of fungicide and 0.5 g of antifoaming agent are added to 93 g of demineralized water. After filtration and packaging, the ink has a pH=8.5, a ρ (resistivity or specific resistance) of 18 ohm.cm and a viscosity of 1.13 cp, the surface tension being 68 dynes/cm.

EXAMPLE 8

1.0 g of ethylene glycol, 2.5 g of electrolyte, 0.8 g of Blu Brillante Acilan (BAYER), 0.2 g of fungicide and 0.5 g of antifoaming agent are added to 97 g of demineralized water.

After filtration and packaging, the ink has a pH=8.5, a ρ (resistivity or specific resistance) of 26 ohm.cm, a viscosity of 1.1 cp and a surface tension of 68 dyne/cm.

EXAMPLE 9

1.0 g of ethylene glycol, 2.5 g of electrolyte, 1.3 g of Special Yellow S (BAYER), 0.2 g of fungicide and 0.5 g of antifoaming agent are added to 95 g of demineralized water.

After filtration and packaging, the ink has a pH=8.3, a ρ (resistivity or specific resistance) of 24 ohm.cm, a viscosity of 1.1 cp and a surface tension of 68 dyne/cm.

Referring to Examples 6, 7, 8 and 9, in which standard cyan, magenta and yellow dyes have been used in the formulae, it is possible to obtain polychrome printing on a multi-nozzle printer. With the embodiment of the printer hereinbefore described, coloured printing can be obtained both by subtractive synthesis of the three primary colours and by additive synthesis.

The formulation of inks for colour printing both by the subtractive and by the additive method obviously requires a measured choice of the reflectance spectrum and of the dye and optimization of its concentration in the vehicle. The Examples represent inks usable for the above-mentioned printing in colours with quality, stability, solubility and optimum reproducibility.

We claim:

1. An ink jet printing device for dot printing alphanumeric characters and/or facsimile type graphics, comprising a plurality of containers for ink, a plurality of nozzles arranged on a common plate made of insulating material and closing said containers, each one of said nozzles being connected to a corresponding one of said containers and having an inner diameter of a few hundredths of millimeter, the ink having an electrical resistivity comprised between 15 and 50 ohm.cm and being in contact with a corresponding electrode, and a plurality of counterelectrodes each one located on said plate adjacent one of said nozzles and selectively energizable by a voltage pulse such as to produce both an ion discharge between the counter electrode and the meniscus of ink in the respective nozzle and a resistive current in the ink of the nozzle as to cause the expulsion of ink particles through the nozzle, said nozzles being disposed in said plate as to print in parallel in different zones of the paper.

2. A device according to claim 1, with a line feed mechanism for the paper operable to feed by increments of a line, characterised in that the containers (17) and the nozzles (22) are mounted on a transversely movable carriage and are spaced in the line feed direction so that the different zones correspond to different lines of characters, the line feed mechanism being controlled so that each nozzle prints successively on a plurality of lines comprised in the corresponding zone, the mechanism completing the advance at the end of the printing of the plurality of lines to a length equal to the total of the zones printed by the nozzles.

3. A device according to claim 1, characterised in that an ink reservoir (43,46,47,49) with a capacity much greater than that of the container (17) is provided for each container, means (58) being provided for causing the ink to circulate continuously between the reservoir and the container.

4. A device according to claim 3, characterised in that a plurality of nozzles (22) disposed in such manner as to print in parallel in different sectors of the paper is connected to each reservoir (43,46,47 or 49).

5. A device according to claim 4, characterised in that the said sectors represent a predetermined fraction of the length of the line, the carriage (11) having a useful stroke equal to the said fraction.

6. A device according to claim 4, characterised in that the nozzles (22) are arrayed in a plurality of rows and one or more columns, the rows being in one to one correspondence with the reservoirs and spaced by at least one line of characters.

7. A device according to claim 3, characterised in that the means for causing circulation comprise a peristaltic pump (58) adapted to act on a flexible duct (57) disposed between a container (17) and the respective reservoir (43,46,47 or 49).

8. A device according to claim 7, characterised in that the pump (58) is common to all the reservoirs and comprises a series of elements (64) arranged concentrically with an axis and adapted to cooperate with a cylindrical cam (63) eccentric with respect to the said axis, the ducts (57) of the reservoirs (43,46,47,49) being disposed between the cam (63) and the said elements (64).

9. A device according to claim 3, characterised in that the reservoirs (43,46,47,49) contain inks of different colours, the counter-electrodes (23) being energized selectively to pring selectively with an ink of predetermined colour.

10. A device according to claim 9, characterised in that at each reversal of the movement of the carriage the paper is moved constantly by the elementary distance of a printing grating, the counter-electrodes (23)

being energized in such manner as to cause the nozzles (22) connected to the various reservoirs (43,46,47,49) to print in the same zone of the paper at different times.

11. A device according to claim 10, characterised in that the counter-electrodes (23) are energized in such manner as to cause the sprays of ink of two or more colours to be superimposed at the same printing point, effecting printing in colours in this way by substractive synthesis.

12. A device according to claim 10, characterised in that the nozzles (22) connected to the various reservoirs (43,46,47,49) are oriented in such manner that each ink is deposited in a predetermined portion of each point of the printing grating, the counterelectrodes (23) being energised so as to bring the sprays of ink of two or more colours close at least at one point of the grating, effecting printing in colours in this way by additive synthesis.

* * * * *